United States Patent [19]

de la Haye

[11] Patent Number: 4,915,533
[45] Date of Patent: Apr. 10, 1990

[54] COUPLING PIECE FOR JOINING TWO OR MORE RODS

[76] Inventor: Cornelis F. de la Haye, Gevers Deynootweg 590, 2586 BS Den Haag, Netherlands

[21] Appl. No.: 101,612

[22] Filed: Sep. 28, 1987

[30] Foreign Application Priority Data

Oct. 2, 1986 [NL] Netherlands ........................ 8602487

[51] Int. Cl.$^4$ .............................................. F16D 1/00
[52] U.S. Cl. .................................... 403/171; 403/176; 403/288
[58] Field of Search ................ 403/171, 172, 176, 288

[56] References Cited

U.S. PATENT DOCUMENTS

| | | | |
|---|---|---|---|
| 4,027,449 | 6/1977 | Cilveti | 403/171 X |
| 4,161,088 | 7/1979 | Gugliotta | 403/176 X |
| 4,313,687 | 2/1982 | Apeztegui et al. | |
| 4,664,550 | 5/1987 | Jachmann | 403/171 |

FOREIGN PATENT DOCUMENTS

| | | |
|---|---|---|
| 874657 | 4/1953 | Fed. Rep. of Germany . |
| 2421758 | 3/1975 | Fed. Rep. of Germany . |
| 2533721 | 2/1977 | Fed. Rep. of Germany . |
| 2633147 | 1/1978 | Fed. Rep. of Germany . |
| 2736635 | 10/1978 | Fed. Rep. of Germany ...... 403/171 |
| 3017444 | 11/1981 | Fed. Rep. of Germany . |
| 2298720 | 8/1976 | France ................................. 403/172 |

Primary Examiner—Andrew V. Kundrat
Attorney, Agent, or Firm—Sprung Horn Kramer & Woods

[57] ABSTRACT

A coupling piece for coupling two or more rods or the like, use being made, for connecting the coupling piece to a rod, of a connector rotatably connectable to said coupling piece, the other end of said connector being adapted for coaction with a rod end by means of a threaded connection. The connector is adapted, through a polygonal outer circumferential portion, to coact for rotation with a ring having a corresponding internal polygonal portion and being provided with external engagement surfaces.

18 Claims, 4 Drawing Sheets

COUPLING PIECE FOR JOINING TWO OR MORE RODS

BACKGROUND OF THE INVENTION

This invention relates to a coupling piece for joining two or more rods or the like, use being made, for joining the coupling piece to a rod, of a connector rotatably connectable to said coupling piece, the other end of said connector being adapted for coaction with a rod end through a threaded connection, said connector being confined by means of a nut in a recess in the coupling piece, and the rod end, respectively.

It is an object of the present invention to achieve a very simple design of such a coupling piece known from German Offenlegungsschrift No. 3,017,444, so that not only a minimum quantity of simple parts, hence inexpensive to manufacture, will be sufficient, but also that a quick assembly or disassembly from the outside is possible, and which at the same time is resistant substantially to the same extent to both compressive forces and tensile forces. Besides, such a coupling piece should be such as to produce a construction having a smooth outer surface, which not only results in a neat appearance but also reduces the chance of dirt and moisture retention. This known construction does not have an adjustment possibility either, so that when the various parts are not quite aligned, (e.g. with arched constructions) substantial unilateral moment forces occur on the abutting faces.

SUMMARY OF THE INVENTION

To that end, the coupling piece according to the present invention is characterized in that the connector, through a polygonal outer circumferential portion, is adapted for rotation to coact with a ring having a corresponding internal polygonal portion and being provided with external engagement surfaces.

In order, in the case of a complete linkage, to remove one rod therefrom, each coupling piece may have such deep bores or through bores, as to allow each connector to be pushed back practically to within the circumferential surface of the coupling piece in mounted condition.

To enable "arching", i.e. a slightly curved construction, the ring surface facing away from the coupling piece may be spherical, as well as the rod end abutting thereon in mounted condition. Also, the nut end oriented towards the centre of the coupling piece may be spherical, as well as the surface of the connector coacting therewith in mounted condition.

Furthermore, also the ring end facing the centre of the coupling piece and the surface of the coupling piece coacting therewith in mounted condition may be spherical. Since, in this case, the ring has on both sides a spherical (in the extreme case an inclined) surface, this takes up the shearing forces and these are not transmitted to the connector, and the shoulderlike portion thereof, respectively.

In both cases, the centre of the curvature radius lies preferably on the axis of the respective bore of the coupling piece, and rod end, respectively.

The connector can be retained in the rod end against an introduced shoulder by a helical spring or the like, which on the other hand is supported against a spring washer or the like. Said spring washer can be disposed at such a distance from the respective rod end that the free end of the connector with the ring provided thereon, in compressed condition of the spring, is approximately aligned with the free ring surface, so that an easy disassembly of a single rod from a linkage is possible.

Another solution of this problem is that in the central cavity of the coupling piece, there is provided a resilient elastic plug.

It is further observed that German Offenlegungsschrift No. 3,017,444, cited in the introduction, describes a coupling piece wherein a separate sleeve or disc has to be welded onto the hollow, square section. The construction is further such that it cannot be arched: to that end it is necessary to not only provide coacting concave/convex surfaces, but moreover all parts are each time to be adjusted to a different length or dimension. The construction as a whole is expensive and requires at least one part more than the construction according to the present invention.

Besides, reference is made to German Offenlegungsschrift No. 25 33 721 and German Auslegeschrift No. 24 21 758, which publications show both constructions lacking a smooth appearance and being difficult to mount. Pushing back the bolt, which is necessary during the mounting of a rod between two fixed nodes, is in both cases problematical. Moreover, the construction according to DAS 24 21 758 shows the use of a divisible connecting piece, which renders the construction more expensive still.

Some embodiments of the coupling piece with accessories for joining two or more rods will now be described, by way of example, with reference to the accompanying drawings, in which:

DETAILED DESCRIPTION OF THE INVENTION

Figure 4:
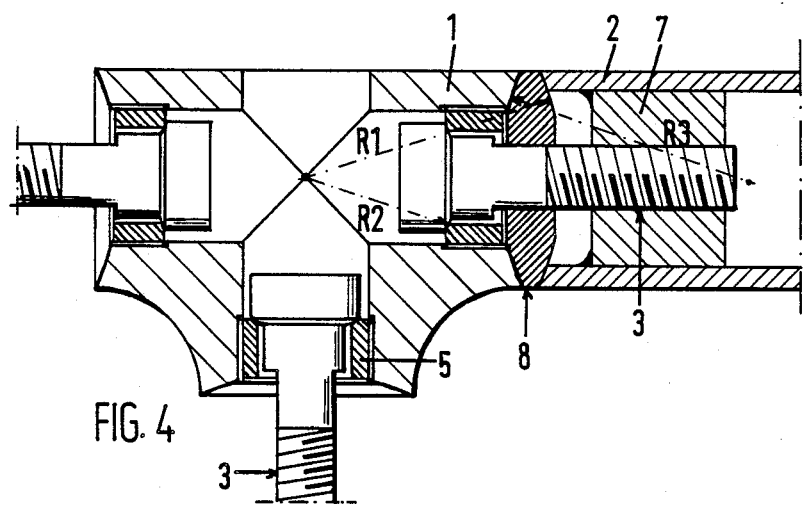
FIG. 4 is a view as in FIG. 1 of a coupling piece for joining three rods.

As shown in the FIGS. 1-4, a coupling piece 1' for joining two or more rods has four, and three coupling possibilities, respectively, for a rod. For the sake of clarity, the coupling piece is always indicated as 1, 1' in FIGS. 1-4, independently of the number of rod connection possibilities. In FIG. 4 a single rod is shown at 2. As shown in the drawings, the connection between coupling piece and rod is effected through a connector 3, essentially having the form of a bolt, and which is retained in a recess or through opening 4 of coupling piece, 1' by means of an externally threaded nut 5 screwed onto opening 4. The threaded outward end 6 of the connector 3 can coact with an internally threaded bush 7 fixedly disposed in the end of rod 2.

Figure 5:
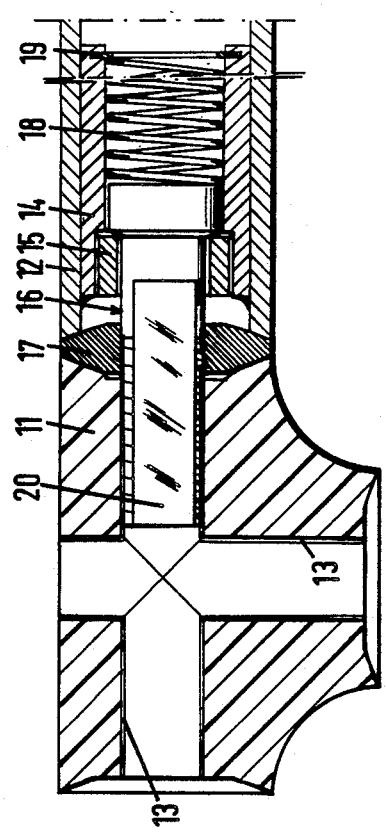
FIG. 5 is a cross-sectional view as in FIG. 1 of a coupling piece for joining three rods, with the connector being provided in the rod end.

The tightening of connector 3 takes place by a ring 8 slidable thereon prior to assembly, the central through opening of which is provided with two flat faces 9 adapted to coact with flat sides 20 provided on the connector and shown only in FIG. 5.

In case the coupling piece is to be used in a linkage wherein a slightly curved surface is necessary, such as a roof, (this is also called "arching" in actual practice) the coacting surfaces of the head of the connector 3 and the coacting surfaces of ring 8, the coupling piece and the rod end 2 are provided with spherical surfaces whose centres of curvature radius lie on the axis of the respective opening of the coupling piece. In this manner, the slight angle (between the axes of rods and coupling pieces) required for arching the construction is taken up in such a manner that a uniform connection of the coacting surfaces is ensured.

The arching can be realized in a simple manner by using rings 8 of different thicknesses in the required places in the linkage, so that the different standard dimensions of the rods can be maintained and yet a curvature can be imparted to the linkage.

Figures 1, 2, 3:
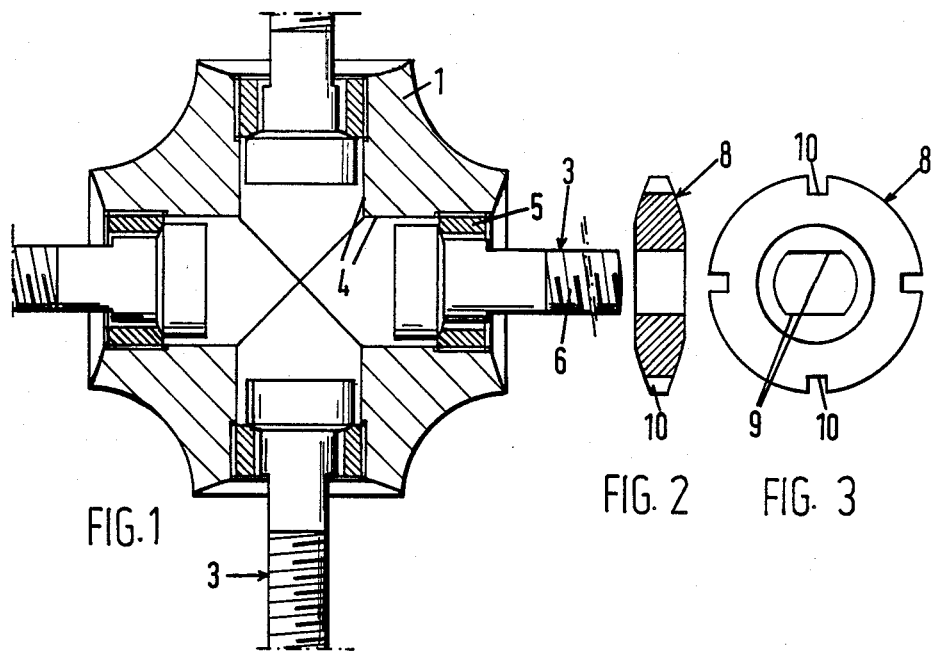
FIG. 1 is a diagrammatic cross-sectional view of a coupling piece according to the present invention suitable for joining four rods.
FIG. 2 is a cross-sectional view of a ring usable in the device shown in FIG. 1.
FIG. 3 is a top view of the ring shown in FIG. 2.

As shown in FIGS. 2 and 3, ring 8 has recesses 10, so that the outside diameter of ring 8 may be identical to the outside diameter of rod 2 to be connected, while on the other hand, yet an easy rotation of the ring can take place by means of a known per se hook spanner.

The coupling pieces and rods, as well as the other parts can be made of metal or synthetic plastics material.

The coupling piece 11 shown in FIG. 5, is provided with three connection possibilities for a rod 12. To that end, there are provided in said coupling piece three threaded openings 13.

In the end of rod 12, there is welded a bush 14 whose inner end facing the free rod end is threaded so as to coact with a nut 15 serving for retaining in bush 14 a connector 16 adapted to coact with the coupling piece 11. The threaded portion of connector 16, in the same manner as in the construction shown in FIGS. 1 and 4, is adapted to coact by means of flats with the flat sides of a ring 17, being entirely identical to the ring 8 shown on FIGS. 1-4.

Connector 16 is retained in bush 14 on the one hand by nut 15 and on the other hand by a helical spring 18 whose other end abuts against a spring washer 19 so that the connector cannot fall out. Naturally the spring washer should be spaced apart from nut 15 so that the connector can be pressed so far into the rod end that the front of the connector is substantially aligned with the surface of ring 17 abutting against the coupling piece, for in that case, an easy demounting can take place.

By using rings of different thicknesses, "arching" can be effected in a simple manner: by providing the rings and the coacting surfaces with a convexity, the whole becomes likewise self-adjusting, while maintaining a complete connection of the coacting surfaces.

The embodiments shown in FIGS. 6-10 will now be described, which are basically the same but constructively simpler, and better, respectively.

Figure 6:
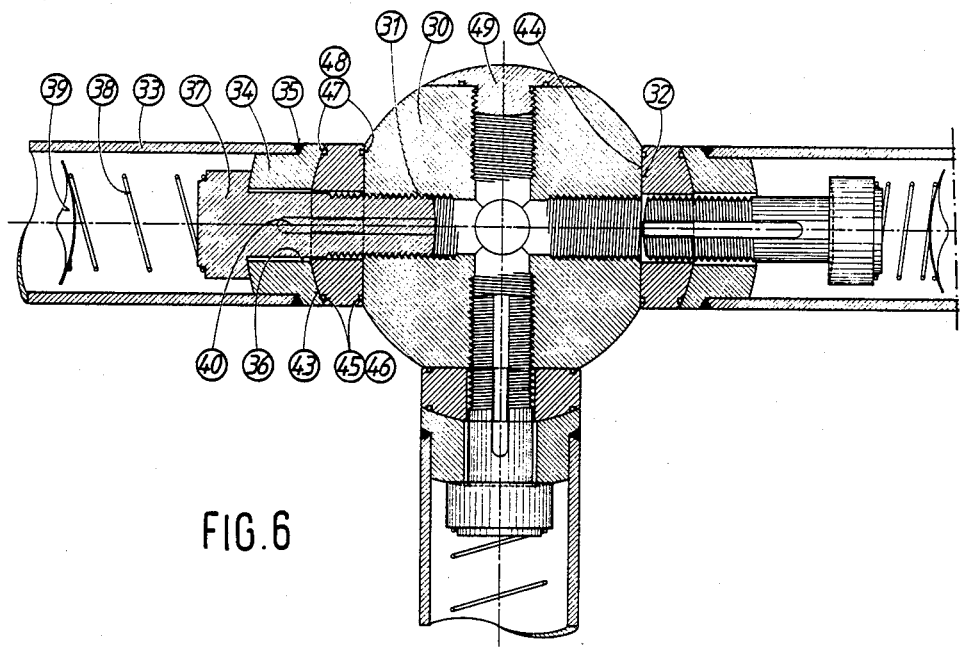
FIG. 6 is a diagrammatic cross-sectional view of a fourth embodiment of the device according to the present invention;.

FIG. 6 shows a node having coupling piece 30 provided with a plurality of connection possibilities. To that end, the coupling piece contains a plurality of threaded openings 31 which terminate in a planar surface 32 of the spherical coupling piece 30. For connecting a tube 33, the respective connecting end thereof is first provided with an internal collar 34 which, in FIG. 6, is attached to the tube by a welded joint 35. Through a central opening 36 in collar 34 extends a bolt 37, which is retained in the tube through a spring 38 and a retaining plate 39.

Figure 10:
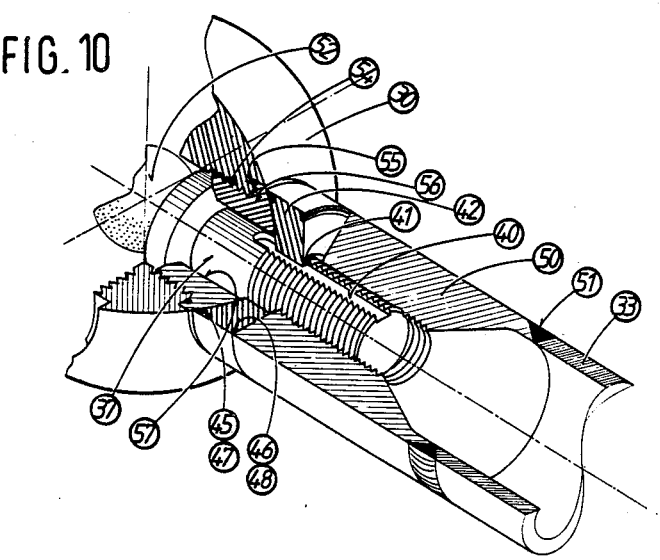
FIG. 10 is a partly cross-sectional perspective view of a node according to FIG. 7.

The bolt 37 has a keyway 40, so that the bolt is suitable for coaction with an inward projection 41 of a ring 42 (see FIG. 10).

As shown further in FIG. 6, for the purpose of arching the construction, the coacting surfaces of collar 34 and the lower surface of the head of bolt 37 are spherical, while the radius of curvature of the convexity lies in the centre of the coupling. A further feature of the construction is that this is entirely sealed against penetration of moisture. To that effect, the radial faces of ring 42, i.e. the faces 43, 44, are provided with annular recesses 45, 46 wherein is received an O-ring 47, 48, as clearly shown in the exploded view shown in FIG. 8. In the embodiment shown in FIG. 6, three of the four connection possibilities are provided with a tube 33, while the fourth connection possibility is blind by disposing a plug or stopper 49 therein.

Figure 7:
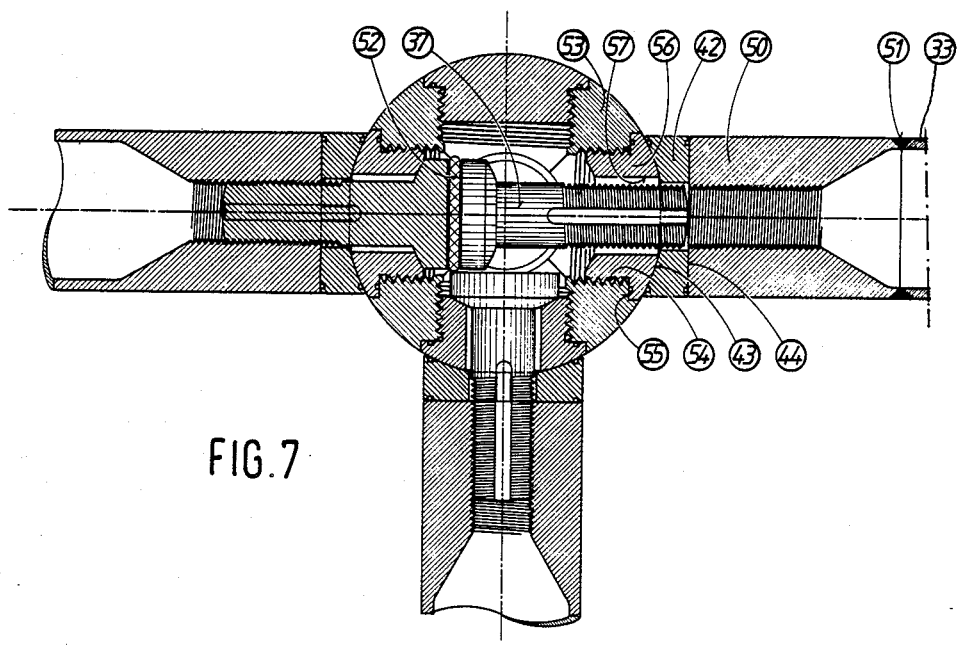
FIG. 7 is a cross-sectional view as in FIG. 6 of a fifth embodiment of the device according to the present invention.

The construction shown in FIG. 7 differs only from that shown in FIG. 6 to the extent that the bolts are now received in the coupling piece, while screw thread is provided in the tube, and forging 50, respectively.

Another difference resides in that the bolt is pushed outwardly from the coupling piece by means of a plug 52 of elastic synthetic plastics material.

As shown in FIG. 7, bolt 37 has such a length that, upon complete withdrawal, i.e. the end opposite the head lies within the periphery of ring 42, it is possible to move tube 33 together with a forging 50 welded thereto in lateral direction; in other words, a rod can be replaced while the coupling piece 30 remains in place.

The differences between the embodiment shown in FIG. 6 and that of FIG. 7 consists further in that in the construction shown in FIG. 7, use is made of a tube 33 to the end of which there is welded a forging 50 through a weld seam 51. In a coupling piece 53 there are provided threaded bores 54 having exteriorly a chamber 55 receiving a collar 56 provided with a bore 57. Between collar 56 and tube 33, in this case forging 50 thereof, there is provided a ring 58. The operation of the device will be clear after the foregoing and will therefore not be further discussed herein. In the embodiment shown in FIG. 7, the convex-concave surfaces are disposed in different places than in the construction shown in FIG. 6, but this is self-evident, so that this will not be further discussed either.

The construction shown in FIG. 7 further shows a "normal connection" with a mounted tube, a blinded threaded hole and a loose connection with the bolt in pushed back position and tube 33 in place.

Figure 8:
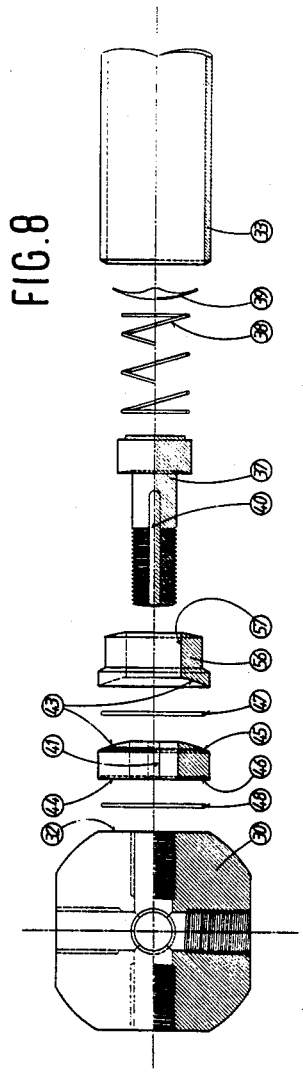
FIG. 8 shows the device according to FIG. 6 in an exploded view.

The construction shown in FIG. 8, exclusively represented for the sake of clarity in order to clearly express the various parts, will not be further described after the foregoing, since it is entirely self-evident.

Figure 9:
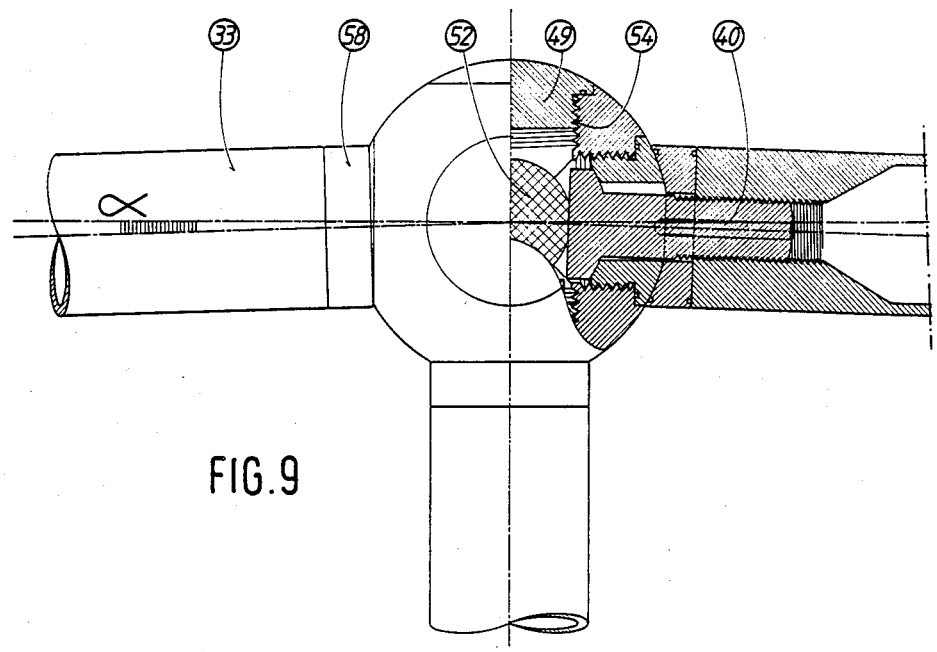
FIG. 9 shows a partly arched construction according to FIG. 7.

FIG. 9 shows a part of the construction shown in FIG. 7 in arched position, i.e. one of the tubes is not co-extensive with the opposite tube but is at an angle alpha to the respective opposite tube.

The embodiment shown in FIG. 10 depicts one connection possibility in part-sectional view, according to FIG. 7, so that it becomes clear that, due to the flat design of the lower surface 44 of ring 42 and the surface of the forging 50 facing the coupling, an easy lateral mounting and demounting is possible.

The construction according to the present invention is simple, contains few parts and can be mounted or demounted by tightening only a single ring. This latter requires in the construction shown in FIGS. 1–4 a known per se hook spanner, while for mounting or demounting the embodiments shown in the further figures, pliers are necessary, which likewise may have a very simple construction, i.e. a hooked portion and a loose portion rotatably connected thereto.

Replacement of a single rod is possible without further demounting the device. The construction according to the present invention is externally completely smooth.

The device is hermetically sealed, i.e. internally optimally protected against penetration of moisture and hence corrosion.

The construction can be subjected both to compressive and tensile forces.

By using rings of different thicknesses, no rods of different lengths are required any longer.

Arching of the construction is possible.

What I claim is:

1. In a coupling piece for coupling two or more rods including a connector rotatably connectable at one end to said coupling piece for connecting the coupling piece to a rod, the other end of said connection having means for coaction with an end of a rod the improvement wherein said connector has a polygonal outer circumferential portion, and further comprising a ring between the rod and coupling piece having a corresponding internal polygonal portion configured to slide axially along the connector and rotate therewith and having external engagement surfaces, wherein the ring has two radial faces and at least one radial face thereof has an annular recess with sealing ring therein.

2. A coupling piece as claimed in claim 1, wherein the coupling piece has deep bores and throughbores to permit each connector to be pushed back to almost within the coupling piece.

3. A coupling piece as claimed in claim 1 wherein the ring has a surface facing away from the coupling piece which is spherical, and having the rod end abutting thereagainst has a spherical surface.

4. A coupling piece as claimed in claim 1, wherein an end of a nut oriented towards the centre of the coupling piece is spherical, as well as the surface of the connector coacting therewith in mounted condition.

5. A coupling piece as claimed in claim 1, wherein the surface of the ring facing the coupling piece and the surface of the coupling piece facing the ring are spherical.

6. A coupling piece as claimed in claim 3 or 5, wherein the centre of curvature radius of the spherical surfaces lies on the axis of the bore of the coupling piece and the rod.

7. A coupling piece as claimed in claim 1, wherein the connector has a shoulder and means for retaining the connector in the rod including a spring washer and a helical spring disposed between the shoulder and the spring washer to hold the connector in place.

8. A coupling piece as claimed in claim 7, wherein the spring washer is spaced apart from the rod end so that the free end of the connector with the ring mounted thereon, in compressed condition of the spring, is approximately co-extensive with the free ring surface.

9. A coupling piece as claimed in claim 1, having rings of different thickness.

10. A coupling piece as claimed in claim 1, wherein, each connector is maintained in place by a resilient elastic plug.

11. A coupling assembly comprising: at least one coupling piece including a body having an outer surface and at least one first coupling means including a coupling bore extending into the body through a portion of the outer surface; at least one rod having at least one end with second coupling means including means forming an end surface with a rod bore therethrough; wherein one of the coupling bore and rod bore is threaded and the other is unthreaded; and means for connecting the at least one end of the at least one rod to the at least one coupling piece comprising an elongated connecting member rotatably and slidably received in the nonthreaded one of the coupling bore and the rod bore with one end extendable out of the unthreaded one of the bores and wherein said one end is threaded and is threadably engageable with the threaded one of the bores, means limiting axial movement of the connecting member to prevent removal from the unthreaded one of the bores and a connecting ring having means mounting same for axial slidable movement along the connecting member and for rotation therewith and disposed between the end surface of the rod and the outer surface of the coupling body and wherein the connecting ring has an outer axial surface configured to effect rotation thereof relative to the coupling body and the rod to axially move the connecting member between an engaged position wherein the threaded end is within the ring and is totally unengaged from the threaded one of the bores and an engaged position wherein the threaded end projects through the ring and is engaged with the threaded one of the bores, wherein the connecting ring has two slide surfaces and at least one side surface has an annular groove and an elastic sealing ring therein.

12. The coupling assembly according to claim 11, wherein one side surface is planar and the other side surface is spherical and wherein one of the end surface of the rod and the portion of the outer surface of the coupling body is spherical and the other is planar.

13. The coupling assembly according to claim 11, wherein each side surface of the connecting ring has an annular groove and an elastic sealing ring therein.

14. The coupling assembly according to claim 11, wherein the rod bore is unthreaded and the connecting member has a shoulder at the other end to prevent sliding movement thereof outwardly through the rod bore and means mounting a spring on the rod having one end engaging the connecting member outwardly.

15. In a coupling piece for coupling two or more rods including a connector rotatably connectable at one end to said coupling piece for connecting the coupling piece to a rod, the other end of said connection having means for coaction with an end of a rod the improvement wherein said connector has a polygonal outer circumferential portion, and further comprising a ring between the rod and coupling piece having a corresponding internal polygonal portion configured to slide axially along the connector and rotate therewith and having external engagement surfaces, wherein the ring has a surface facing away from the coupling place which is spherical, and the rod end abutting thereagainst has a spherical surface.

16. A coupling assembly comprising: at least one coupling piece including a body having an outer surface and at least one first coupling means including a coupling bore extending into the body through a portion of the outer surface; at least one rod having at least one end with second coupling means including means forming an end surface with a rod bore therethrough; wherein one of the coupling bore and rod bore is threaded and the other is unthreaded; and means for connecting the at least one end of the at least one rod to the at least one coupling piece comprising an elongated connecting member rotatably and slidably received in the nonthreaded one of the coupling bore and the rod bore with one end extending out of the unthreaded one of the bores and wherein said one end is threaded and is threadably engageable with the threaded one of the bores, means limiting axial movement of the connecting member to prevent removal from the unthreaded one of the bores and a connecting ring having means mounting same for axial slidable movement along the connecting member and for rotation therewith and disposed between the end surface of the rod and the outer surface of the coupling body and wherein the connecting ring has an outer axial surface configured to effect rotation thereof relative to the coupling body and the rod to axially move the connecting member between an unengaged position wherein the threaded end is within the ring and is totally unengaged from the threaded one of the bores and an engaged position wherein the threaded end projects through the ring and is engaged with the threaded one of the bores, and means spring biasing the connecting member in a direction outwardly of the unthreaded bore to permit inward movement thereof against a biasing force of the spring biasing means in response to a inwardly directed force, wherein the connecting ring has two side surfaces and wherein each side surface of the connecting ring has an annular groove and an elastic sealing ring therein.

17. The coupling assembly according to claim 16, wherein one side surface is planar and the other side surface is spherical and wherein one of the end surface of the rod and the portion of the outer surface of the coupling body is spherical and the other is planar.

18. The coupling assembly according to claim 16, wherein the rod bore is unthreaded and the connecting member has a shoulder at the other end to prevent sliding movement thereof outwardly through the rod bore and the spring biasing means comprises means mounting a spring on the rod having one end engaging the connecting member outwardly.

* * * * *